(12) United States Patent
Lee et al.

(10) Patent No.: US 7,938,570 B2
(45) Date of Patent: May 10, 2011

(54) QUICK-RELEASE WORKLIGHT MOUNTING

(75) Inventors: Wade Lee, Danville, CA (US); Donald R. Sandell, San Jose, CA (US)

(73) Assignee: EML Technologies LLC, Danville, CA (US)

( * ) Notice: Subject to any disclaimer, the term of this patent is extended or adjusted under 35 U.S.C. 154(b) by 1586 days.

(21) Appl. No.: 10/874,144

(22) Filed: Jun. 21, 2004

(65) Prior Publication Data

US 2004/0257805 A1    Dec. 23, 2004

(51) Int. Cl.
*H01R 33/00* (2006.01)
(52) U.S. Cl. ........................................ 362/652; 362/340
(58) Field of Classification Search .................. 362/368, 362/414, 431, 652, 649, 640, 655, 656, 657, 362/658, 659; 403/321, 322.1, 322.2, 322.3, 403/324, 325, 326, 327, 328
See application file for complete search history.

(56) References Cited

U.S. PATENT DOCUMENTS

| | | | |
|---|---|---|---|
| 5,307,255 A * | 4/1994 | Chen ............................ | 362/410 |
| 5,337,100 A | 8/1994 | Oxford | |
| 5,708,889 A | 1/1998 | Speggiorin | |
| 5,779,350 A | 7/1998 | Chang | |
| 6,196,504 B1 | 3/2001 | Lemke | |
| 6,220,728 B1 | 4/2001 | Andrus et al. ................ | 362/287 |
| 6,761,469 B2 * | 7/2004 | Wu .............................. | 362/655 |

* cited by examiner

*Primary Examiner* — Hargobind S Sawhney
(74) *Attorney, Agent, or Firm* — Elliot B. Aronson

(57) ABSTRACT

A quick-release mounting mechanism for a worklight enabling the worklight to be quickly and easily mounted on and demounted from a tripod support stand and enabling an individual worklight head to be quickly and easily mounted on and demounted from a base stand or other support member such as the handle of a spring clamp or other clamp member. The mounting mechanism includes a latch member on the worklight base or on an individual worklight head that cooperates with an actuator mounted in the support stand or other support member. The latch member is received in a hole in the support and the actuator is formed to engage a catch on the latch member when the worklight or individual worklight head is in position on the support. In particular, the actuator is mounted in the support for movement between a latching position and a release position, and the latch member and actuator are formed to engage one another when the actuator is in its latching position so as to hold the worklight or individual worklight head on the support. A spring arrangement in the support urges the actuator into its latching position, and the actuator is provided with an engagement member by which a user can urge the actuator into its release position for quick release of the worklight or the head from the support.

28 Claims, 4 Drawing Sheets

QUICK-RELEASE WORKLIGHT MOUNTING

BACKGROUND OF THE INVENTION

The present invention relates to worklights and is more particularly directed to arrangements for mounting and demounting a worklight from a support structure such as a tripod or other supporting base.

Worklights have become popular for use in such varied settings as construction jobs, industrial plants, automotive and auto body repair shops, artist and photographic studios, and projects around the home. A typical worklight has one or two, or sometimes more, worklight heads that are supported on a base. In a common type of worklight the base is formed so that it can be mounted on a tripod support stand at the worksite at the time of use and demounted from the support stand for storage. The base typically includes a knob with a threaded stud that is screwed into a receiving member on the tripod support stand. Other worklight models provide for some amount of disassembly for storage. For example, the individual worklight heads may sometimes be removed from the base so that the worklight can be stored compactly in a case. See, for example, U.S. Pat. No. 5,779,350. Here too the heads are typically secured to the base with a knob on a threaded stud. Although conventional, the use of such knobs is inconvenient at best, is often awkward because of the lack of space to get a good grip on the knob or the need to balance the unit while tightening the knob, and can be annoying slow in setting up or disassembling the worklight.

SUMMARY OF THE INVENTION

The present invention provides a quick-release mounting mechanism for a worklight enabling the worklight to be quickly and easily mounted on and demounted from a tripod support stand and enabling an individual worklight head to be quickly and easily mounted on and demounted from a base stand or other support member such as the handle of a spring clamp or other clamp member.

Briefly, the mounting mechanism includes a latch member on the worklight base or on an individual worklight head that cooperates with an actuator mounted in the support stand or other support member. The latch member is received in a hole in the support and the actuator is formed to engage a catch on the latch member when the worklight or individual worklight head is in position on the support. In particular, the actuator is mounted in the support for movement between a latching position and a release position, and the latch member and actuator are formed to engage one another when the actuator is in its latching position so as to hold the worklight or individual worklight head on the support. A spring arrangement in the support urges the actuator into its latching position, and the actuator is provided with an engagement member by which a user can urge the actuator into its release position for quick release of the worklight or the head from the support.

It is an object of the invention to provide a worklight with quick-release mechanism that enables the worklight to be mounted on a support stand primarily by simply positioning the worklight on the stand and without the need to balance the worklight in position on the stand while tightening a knob. It is another object of the invention to provide a quick-release mechanism that enables the worklight to be removed from the stand with a simple hand movement such as pressing a button or lever or turning an actuator through a fraction of a turn to release the worklight from the stand. It is another object of the invention to provide such a quick-release mechanism that can be used with an individual worklight head to permit the head to be disassembled from a base or from some other support quickly and easily for storage. It is yet another object of the invention to provide a receiver assembly that includes the actuator portion of the quick-release mechanism and that can be mounted simply and easily in a support member to give the support the capacity for quick-release worklight mounting.

Other aspects, advantages, and novel features of the invention are described below or will be readily apparent to those skilled in the art from the following specifications and drawings of illustrative embodiments.

DETAILED DESCRIPTION OF ILLUSTRATIVE EMBODIMENTS

Figure 1:
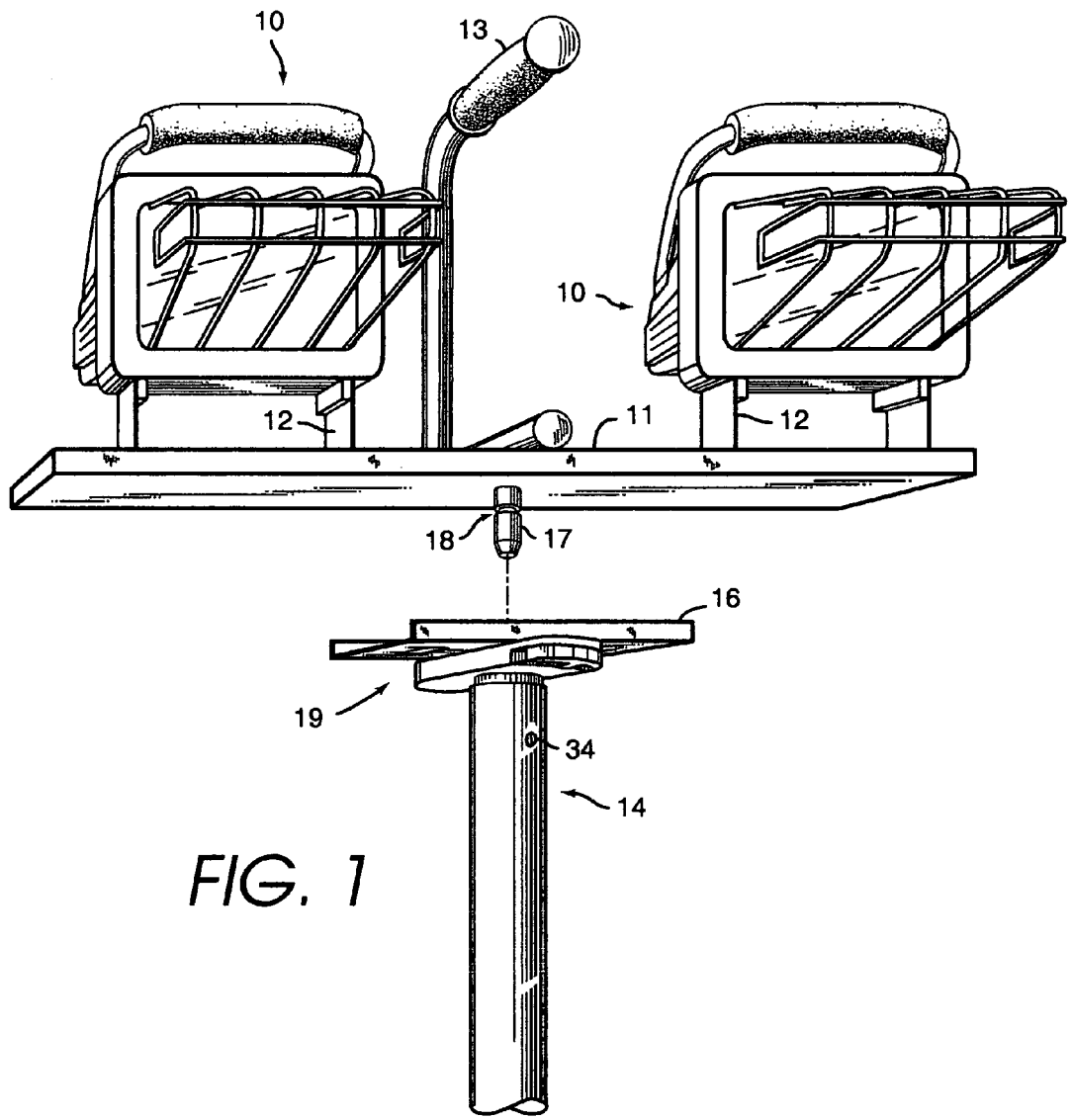
FIG. 1 is an overall perspective view of an embodiment of worklight mounted on a support stand with quick-release mounting mechanism according to the invention.

FIG. 1 shows an overall view of a dual-head worklight incorporating an embodiment of a quick-release mounting mechanism according to the invention for mounting and demounting the worklight to and from a support stand. Such a mounting is referred to here as a detachable mounting, meaning that it permits the worklight to be readily attached to and detached from the support in the ordinary course of worklight usage.

The worklight of FIG. 1 includes a pair of worklight heads 10, which are mounted on a base 11 through U-shaped mounting brackets 12. A handle 13 is secured to the base for carrying and positioning the worklight. As explained below, the worklight is adapted at the underside of base 11 to be mounted on a support 14, the upper portion of which is shown in FIG. 1. A common form of support used with worklights is a tripod support stand. The particular form of support stand is not important here, and for purposes of explanation only the upper portion of the stand need be illustrated in FIG. 1. Secured to the top of support 14 is a horizontal stabilizing member 16 shaped and dimensioned to receive base 11.

In the illustration of FIG. 1 base 11 is provided by a single horizontal support bar, to which the heads 10 are directly attached through U-shaped mounting brackets, but other worklight configurations may include other more complicated base structures. For example, in other worklights the base may form a stand that can be set directly on the ground or other work surface and that is also adapted at some position on the base to be mounted on a tripod support stand. In a simple such example the base may have feet attached to the horizontal cross bar supporting the heads. Alternatively, the base may have a more complicated structure for resting on the work surface. The general mounting mechanism disclosed here can be adapted for use with any form of base and tripod or other support structure and is not intended to be limited only to the form of base illustrated in FIG. 1 or only to mounting on a tripod support stand.

An embodiment of quick-release mounting mechanism is now described with reference to FIGS. 1, 2, 3A and 3B, in which handle 13 has been omitted from FIG. 2 to simplify the figure. Base 11 carries a base latch member provided here by stud 17 fixed to the underside of the base for attachment to support 14. In FIG. 1 stud 17 is attached to the underside of base cross bar 11, but in more complicated base arrangements, it may be more convenient to attach the stud to some other portion of the base. When known worklight designs that use a threaded rod for securing the worklight to a tripod support stand are converted to the present quick-release mounting mechanism, the stud is attached at the same location as the threaded rod in the pre-existing design. The stud is formed with a latching catch, provided here by transverse groove 18 around the perimeter of the stud, which cooperates with a latching structure in support 14 for retaining the stud in the support.

Figure 3A:
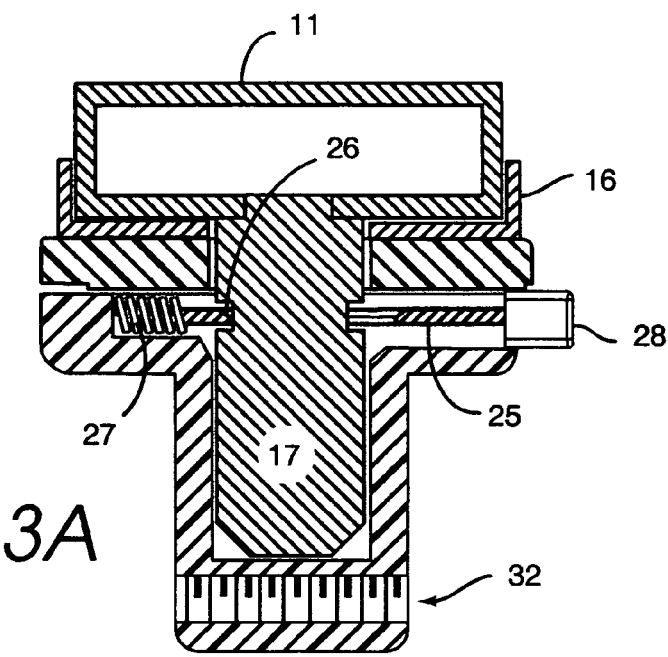
FIGS. 3A and 3B are cross-sectional views of an embodiment of quick-release mounting mechanism in latching position and in release position, respectively.

The upper extremity of support 14 includes a receiver assembly, indicated generally at reference numeral 19, for receiving the base latch member 17 and releasably securing it to the support. Receiver assembly 19 has a receiver housing including an upper portion 21 and a separate lower portion 22. Upper portion 21 includes horizontal stabilizing member 16 and a housing cover member 23. A hole, indicated generally at reference numeral 24, is formed through horizontal stabilizing member 16 and into the receiver assembly for receiving the stud. An actuator 25 is mounted in receiver assembly 19 for movement between a latching position and a release position. The stud and actuator are formed to engage one another in the latching position so as to hold the stud in support 14 and thereby retain the worklight in position on the support. More particularly, actuator 25 is formed with an aperture through its midsection through which stud 17 extends, and the stud and actuator are disposed with respect to one another such that an edge 26 of the actuator aperture fits in groove 18 when the actuator is in its latching position as seen in FIG. 3A. When the actuator is in its release position the stud is free to be pulled through the actuator aperture and out of hole 24. A spring arrangement, provided here by compression spring 27, is disposed to urge actuator 25 into the latching position in the normal course so that the quick-release mechanism is normally latched. An engagement member 28 formed and disposed for engagement by a user is operatively associated with the actuator for urging the actuator into the release position for quick release of the worklight from support 14. The engagement member 28 is provided here by a plastic cap that grips the end of actuator 25 and is shaped to provide a comfortable engagement surface for a user to depress in order to release the stud.

Figure 3B:
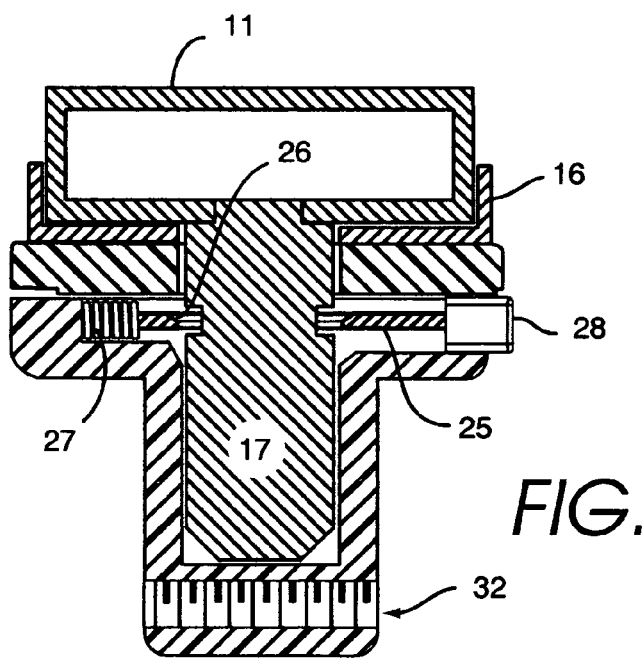

FIGS. 3A and 3B are cross-sectional views of receiver assembly 19 with stud 17 in place in the receiver assembly. In FIG. 3A actuator 25 is in its latching position and is seen engaging the stud at groove 18. In FIG. 3B the actuator is in its release position, and the aperture through the actuator is lined up so that the stud can be pulled out without interference.

Figure 2:
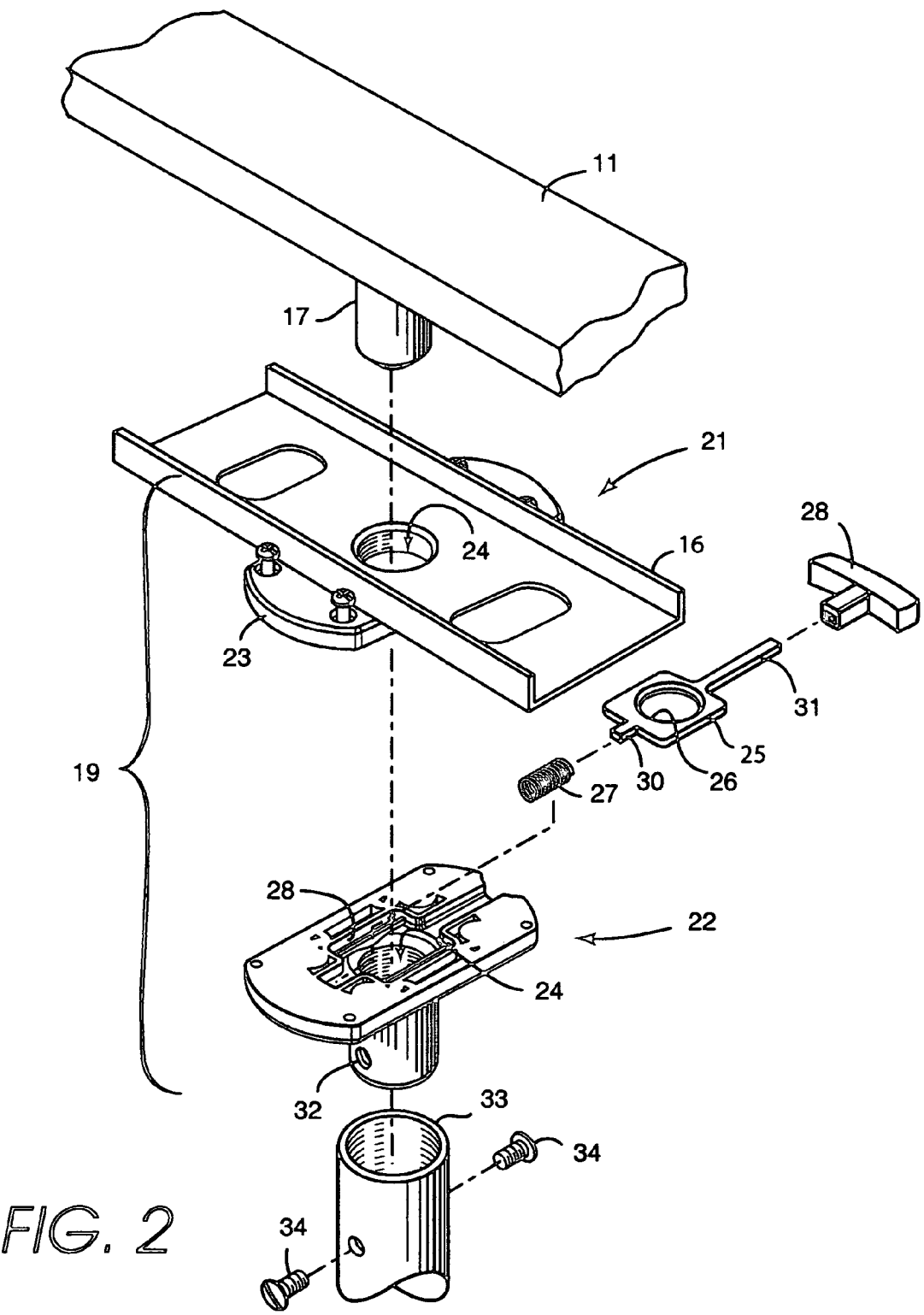
FIG. 2 is an exploded perspective view of the embodiment of quick-release mounting mechanism of FIG. 1.

As seen in FIG. 2 receiver assembly 19 has an internal cavity 29 shaped to form a guide allowing actuator 25 to slide to and fro between the latching and release positions. Actuator 25 is formed by a generally flat, elongate member and has a spring-retaining protrusion 30 at one end that spring 27 slides onto. Actuator 25 is formed at its other end with a narrow neck 31, to which engagement cap 28 attaches. This construction is advantageous in that it is particularly simple and economical to manufacture and assemble. The spring and engagement cap are slid onto the actuator, the assembly is placed into cavity 29, and the receiver cover 23 is screwed down or otherwise secured to the lower portion 22 of the receiver assembly.

A construction using a self-contained receiver assembly is advantageous in that it allows the receiver assembly to be assembled separately and then attached to the upper portion of the support. A common form of tripod support construction employs hollow tubing, typically with two or three sections in telescoping arrangement. When at least the top portion of the support is formed with hollow tubing, the receiver assembly is simply inserted into the tubing and secured in position with screws, pins or any other desired method. In the embodiment of the figures, the receiver assembly has a tapped bore 32 at its lower extremity and is held in position in upper support tubing 33 by screws 34.

A self-contained receiver assembly having its own housing is a convenient way to implement the quick-release mechanism of the invention particularly when used with a support employing hollow tubing to receive the receiver assembly. The quick-release mechanism may nevertheless be implemented without a self-contained receiver assembly. To this end, for example, a hole may be bored directly into a solid end of an upper support portion to receive the base latch member. An appropriately shaped cavity may be milled or otherwise formed directly in the solid end or alternatively in the bottom of a separate cover or cap to be secured to the support upper end, or even directly in the bottom of the horizontal stabilizing member.

The quick-release mechanism can also be implemented in a number of other ways that will be readily apparent to those of ordinary skill in the art given the examples and explanations provided herein. For example, the base latch member is shown here as generally cylindrical. While it is convenient to form the base latch member from cylindrical rod, other shapes may of course also be used. In certain embodiments the use of another shape such as a three-sided or four-sided rod may even be advantageous to provide an indexing function so that the worklight can be mounted in the support in only three or four orientations with respect to the support. Alternatively, indexing ridges or other structures may be provided on the base latch member with appropriate mating grooves or other mating structures being formed in the upper support. In addition, although the illustrated base latch member has only a single projecting stud, other forms of base latch member may be used, providing, for example, two or more projections to be inserted into receiving holes in the upper support so as to serve an indexing function along with a latching function. Other forms of latching catch may also be provided. The illustrated latching catch is in the form of an annular groove in stud 17, which is advantageous for ease of fabrication in a cylindrical stud. The base latch member may nevertheless have alternative forms and shapes of grooves, bores, cavities, recesses, depressions or the like, all referred to here generally as indentations, to provide the latching catch. For example, the groove need not go all the way around the stud, but need only extend sufficiently far around the stud to receive the corresponding edge of the actuator. In another alternative the stud may be formed with one or more small projecting pins, and the hole in the receiver assembly or upper support may be formed so that the stud with projecting pin or pins can be slid into the hole. The actuator in the latching position slides over the pins to prevent the stud from being pulled out. In the release position the projections on the stud slide by the actuator. In this configuration the actuator may be mounted for linear sliding movement between the latching and release positions or for rotational sliding movement for example to rotate a release notch in the actuator over the pins for the release position. Alternatively, an entirely different form of actuator may be used providing one or more pins, and the corresponding latching catch may then be provided by corresponding bores in the base latch member for receiving the one or more pins. In addition, other spring arrangements may also be used for biasing the actuator into a normally latched position. While the illustrated arrangement with compression spring 26 is particularly simple, elegant, and easy to assemble, and is advantageous for these reasons, nevertheless other forms of spring such as tension springs, lever springs, leaf springs or other biasing arrangements or even multiple-spring arrangements may also be used.

Figure 4:
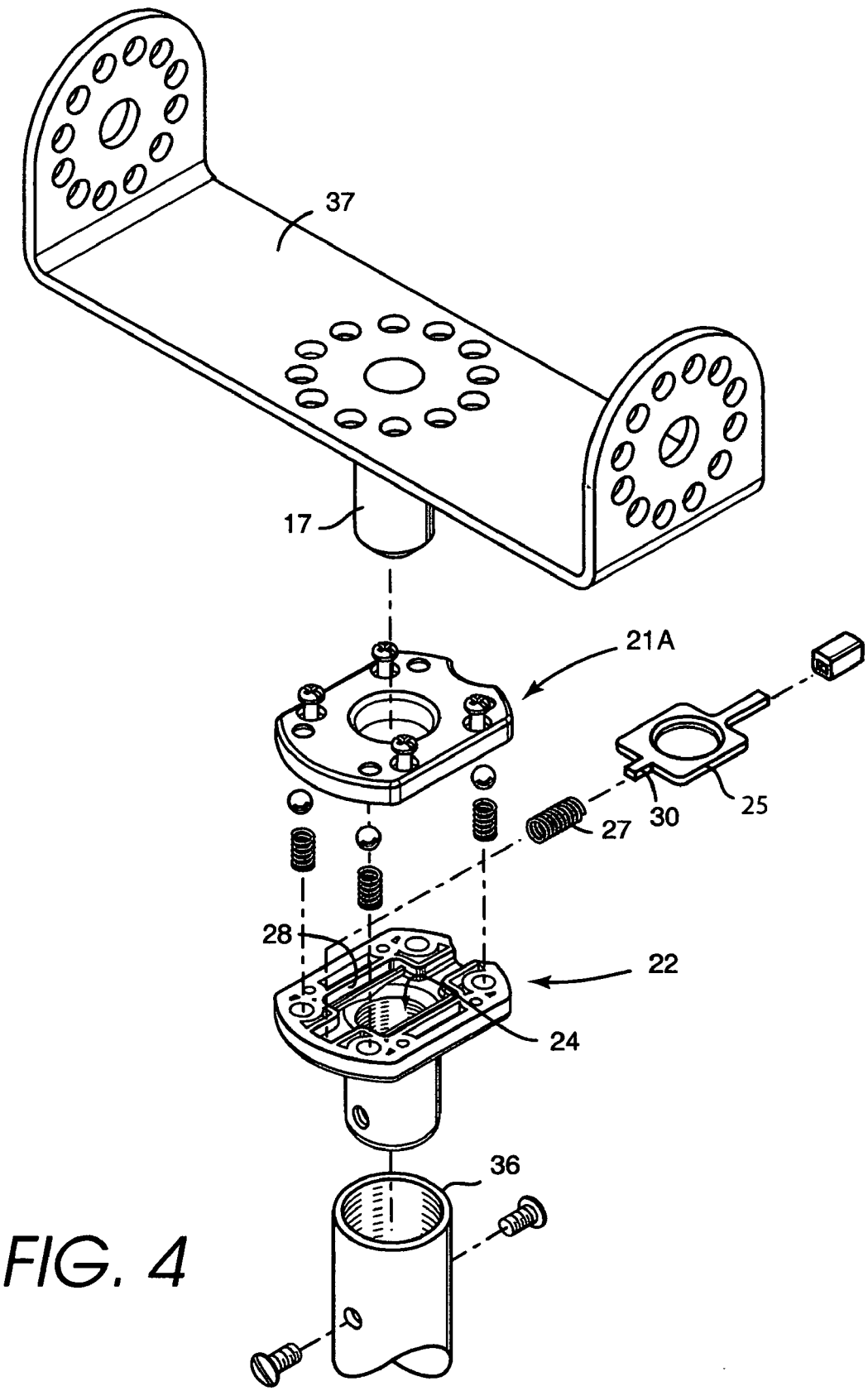
FIG. 4 is an overall view of an alternative application of the invention.

The quick-release mechanism has been illustrated thus far in a popular form of dual-head worklight mounted on a tripod support stand. FIG. 4 shows an alternative application in a single worklight head mounted on a support that can be attached to a clamp or other structure. Like components in FIGS. 4 and 2 have been given like reference numerals. To permit a larger-scale illustration, the worklight head itself has been omitted from FIG. 4 and only the U-shaped mounting bracket 37 is shown. Here the upper receiver portion 21A has been somewhat shortened to accommodate the narrower width of bracket 37 compared with the width of base support 11 in FIG. 2. This arrangement is suitable for example in a so-called clamp light, in which tubing portion 36 is attached at its lower end to a spring clamp or other form of clamp.

In yet another application the quick-release mechanism can be used in those worklight models in which the individual heads are removed from the base for storage in a carrying case, such as mentioned above under the background of the invention and illustrated for example in U.S. Pat. No. 5,779,350. In such models the quick-release mechanism provides for greater speed and convenience in the disassembly and reassembly of the heads.

The above descriptions and drawings are given to illustrate and provide examples of various aspects of the invention in various embodiments. It is not intended to limit the invention only to these examples and illustrations. Given the benefit of the above disclosure, those skilled in the art may be able to devise various modifications and alternate constructions that although differing from the examples disclosed herein nevertheless enjoy the benefits of the invention and fall within the scope of the invention, which is to be defined by the following claims.

What is claimed is:

1. A worklight assembly including a worklight and a support, the worklight having one or more worklight heads mounted on a base and the base being adapted for mounting and demounting to and from the support in the ordinary course of worklight usage, wherein the improvement comprises:
   a quick-release mounting mechanism for detachably mounting said worklight on said support, said mounting mechanism comprising:
   a base latch member connected to said base and formed to extend into said support, said base latch member including a latching catch;
   a hole in said support formed for receiving said base latch member;
   an actuator for engaging said catch, said actuator being mounted in said support for movement between a latching position and a release position,
   wherein said base latch member and said actuator are formed to engage one another when said actuator is in said latching position so as to hold said worklight on said support;
   a spring arrangement disposed to urge said actuator into said latching position; and
   an engagement member formed and disposed for engagement by a user and operatively associated with said actuator for urging said actuator into said release position for quick release of said worklight from said support.

2. The worklight assembly of claim 1 wherein said catch comprises an indentation formed in said base latch member and disposed for receiving a portion of said actuator, and said actuator has a portion formed and disposed to be received in said indentation, when said actuator is in said latching position.

3. The worklight assembly of claim 2 wherein said indentation is in the form of a transverse groove.

4. The worklight assembly of claim 3
   wherein said actuator has an aperture therethrough and said base latch member extends through said aperture when said base latch member is received in said hole; and
   wherein said aperture is shaped such that an edge of said aperture provides said actuator portion formed to be received in said groove when said actuator is in said latching position.

5. The worklight assembly of claim 4 wherein said base latch member is generally cylindrical and said aperture is circular.

6. The worklight assembly of claim 4 wherein said actuator comprises a generally flat, elongate member,
   wherein said aperture is formed in a midsection of said elongate member; and
   wherein said engagement member is disposed at an end of said elongate member.

7. The worklight assembly of claim 6, further comprising a guide in said support for receiving said elongate member, said elongate member being slidable in said guide for movement between said latching and release positions.

8. The worklight assembly of claim 7 wherein said spring arrangement comprises a compression spring disposed to urge said edge of said aperture into said groove.

9. The worklight assembly of claim 2 further comprising a guide in said support for receiving said actuator, said actuator being slidable in said guide for movement between said latching and release positions.

10. The worklight assembly of claim 9 further comprising a self-contained receiver assembly,
    wherein said hole and said guide are defined in said receiver assembly, and said actuator and said spring arrangement are mounted in said receiver assembly, and
    wherein said receiver assembly is mounted in said support for receiving said base latch member.

11. A worklight assembly including a worklight and a support, the worklight having one or more worklight heads mounted on a base and the base being adapted for mounting and demounting to and from the support in the ordinary course of worklight usage, wherein the improvement comprises:
    a quick-release mounting mechanism for detachably mounting said worklight on said support, said mounting mechanism comprising:
    a receiver assembly mounted in said support; and
    a stud connected to said base and formed to extend into said receiver assembly, said stud including a latching catch;
    wherein said receiver assembly includes
    a first portion structured to engage said worklight at said base when said worklight is mounted on said support;
    a hole sized and shaped for receiving said stud;

an actuator for engaging said catch, said actuator being mounted in said receiver assembly for movement between a latching position and a release position,
wherein said stud and said actuator are formed to engage one another when said actuator is in said latching position so as to hold said worklight on said support;
a spring arrangement disposed in said receiver assembly to urge said actuator into said latching position; and
an engagement member formed and disposed for engagement by a user and operatively associated with said actuator for urging said actuator into said release position for quick release of said worklight from said support.

12. The worklight assembly of claim 11 wherein said catch comprises an indentation formed in said stud and disposed for receiving a portion of said actuator, and said actuator has a portion formed and disposed to be received in said indentation, when said actuator is in said latching position.

13. The worklight assembly of claim 12 wherein said indentation is in the form of a transverse groove.

14. The worklight assembly of claim 13
wherein said actuator has an aperture therethrough and said stud extends through said aperture when said stud is received in said hole; and
wherein said aperture is shaped such that an edge of said aperture provides said actuator portion formed to be received in said groove when said actuator is in said latching position.

15. The worklight assembly of claim 14 wherein said actuator comprises a generally flat, elongate member,
wherein said aperture is formed in a midsection of said elongate member; and
wherein said engagement member is disposed at an end of said elongate member.

16. The worklight assembly of claim 15, further comprising a guide in said support for receiving said elongate member, said elongate member being slidable in said guide for movement between said latching and release positions.

17. The worklight assembly of claim 16 wherein said spring, arrangement comprises a compression spring disposed to urge said edge of said aperture into said groove.

18. A worklight assembly including a worklight and a support, the worklight having one or more worklight heads mounted on a base and the base being adapted for mounting and demounting to and from the support in the ordinary course of worklight usage, wherein the improvement comprises:
a quick-release mounting mechanism for detachably mounting said worklight on said support, said mounting mechanism comprising:
a generally cylindrical stud mounted on said base, said stud having a transverse groove formed therein;
a receiver assembly mounted in said support, wherein said receiver assembly includes
a member structured to engage said worklight at said base when said worklight is mounted on said support;
a generally cylindrical hole sized to receive said stud;
a generally flat actuator member having an aperture through a midsection thereof sized to receive said stud when said worklight is in position on said support;
an engagement member comprising a cap mounted at an end of said actuator member opposite said first end;
wherein said receiver assembly is formed with an interior cavity for receiving said actuator member and said cavity being formed such that
said actuator slides to and fro therein between a latching position and a release position, said actuator member in said latching position having an edge of said aperture engaged in said transverse groove; and
a compression spring mounted at a first end of said actuator member normally urging said actuator member into said latching position;
whereby a user pressing on said cap urges said actuator member from said latching position to said release position; and
wherein said support has a generally hollow upper tubular section and said receiver assembly has a lower portion shaped to be received in said upper tubular section.

19. An individual worklight head mounted on a support, wherein the improvement comprises:
a quick-release mounting mechanism detachably mounting said head on said support, said mounting mechanism comprising:
a base latch member connected to said head and formed to extend into said support, said base latch member including a latching catch;
a hole in said support formed for receiving said base latch member;
an actuator for engaging said catch, said actuator being mounted in said support for movement between a latching position and a release position,
wherein said base latch member and said actuator are formed to engage one another when said actuator is in said latching position so as to hold said head on said support;
a spring arrangement disposed to urge said actuator into said latching position; and
an engagement member formed and disposed for engagement by a user and operatively associated with said actuator for urging said actuator into said release position for quick release of said head from said support.

20. The worklight head and support of claim 19 wherein said catch comprises an indentation formed in said base latch member and disposed for receiving a portion of said actuator, and said actuator has a portion formed and disposed to be received in said indentation, when said actuator is in said latching position.

21. The worklight head and support of claim 20 wherein said indentation is in the form of a transverse groove.

22. The worklight head and support of claim 21
wherein said actuator has an aperture therethrough and said base latch member extends through said aperture when said base latch member is received in said hole; and
wherein said aperture is shaped such that an edge of said aperture provides said actuator portion formed to be received in said groove when said actuator is in said latching position.

23. The worklight head and support of claim 22 wherein said base latch member is generally cylindrical and said aperture is circular.

24. The worklight head and support of claim 22 wherein said actuator comprises a generally flat, elongate member, wherein said aperture is formed in a midsection of said elongate member; and wherein said engagement member is disposed at an end of said elongate member.

25. The worklight head and support of claim 24, further comprising a guide in said support for receiving said elongate member, said elongate member being slidable in said guide for movement between said latching and release positions.

26. The worklight head and support of claim 25 wherein said spring arrangement comprises a compression spring disposed to urge said edge of said aperture into said groove.

27. The worklight head and support of claim 20 further comprising a guide in said support for receiving said actuator, said actuator being slidable in said guide for movement between said latching and release positions.

28. A quick-release receiver mechanism for detachably mounting a worklight or an individual worklight head on a support, the worklight or individual worklight head including a mounting stud and the support having a generally hollow upper portion, the receiver mechanism comprising:

a receiver housing having a first portion structured to engage said worklight or said head when said worklight or said head is mounted on said support and a second portion shaped and sized to be received in the generally hollow upper portion of said support;

wherein said receiver housing defines a hole sized and shaped for receiving said stud;

an actuator for engaging said stud, said actuator being mounted in said receiver housing for movement between a latching position and a release position, wherein said actuator is formed to engage said stud and hold said stud in said receiver housing when said actuator is in said latching position;

a spring arrangement disposed to urge said actuator into said latching position; and an engagement member formed and disposed for engagement by a user and operatively associated with said actuator for urging said actuator into said release position for quick release of said worklight or said head from said support.

* * * * *